United States Patent [19]

Cohen et al.

[11] Patent Number: 5,799,210
[45] Date of Patent: Aug. 25, 1998

[54] METHOD FOR ALLOCATING EITHER PRIVATE OR SHARED BUFFER MEMORY FOR STORING DATA FROM SORT OPERATIONS IN ACCORDANCE WITH AN ASSIGNED VALUE OR THRESHOLD VALUE

[75] Inventors: Jeffrey I. Cohen, Mountain View; William H. Waddington, Foster City, both of Calif.

[73] Assignee: Oracle Corporation, Redwood Shores, Calif.

[21] Appl. No.: 634,694

[22] Filed: Apr. 18, 1996

[51] Int. Cl.[6] .................................................. G06F 13/00
[52] U.S. Cl. .................................. 395/876; 395/872; 707/7; 711/118; 711/130; 711/121
[58] Field of Search .......................... 395/872, 876; 707/7, 2, 202; 711/118, 130, 121, 170, 117, 2

[56] References Cited

U.S. PATENT DOCUMENTS

| | | | |
|---|---|---|---|
| 4,967,341 | 10/1990 | Yamamoto et al. | 707/2 |
| 5,089,985 | 2/1992 | Chang et al. | 707/2 |
| 5,179,662 | 1/1993 | Corrigan et al. | 711/2 |
| 5,210,870 | 5/1993 | Baum et al. | 707/7 |
| 5,237,661 | 8/1993 | Kawamura et al. | 395/872 |
| 5,491,810 | 2/1996 | Allen | 711/117 |
| 5,581,736 | 12/1996 | Smith | 711/170 |
| 5,640,561 | 6/1997 | Satoh et al. | 707/202 |

*Primary Examiner*—Frank J. Asta
*Assistant Examiner*—Le Hien Luu
*Attorney, Agent, or Firm*—McDermott, Will & Emery

[57] ABSTRACT

A method and apparatus are provided for allocating buffer memory for database sort operations. A database parameter is set to determine whether and how direct write buffers are to be allocated for sort operations. If the parameter is set to a first value, then no direct write buffers will be used, and sort operations will write to disk through a buffer cache. If the parameter is set to a second value, then direct write buffers will be used to perform writes to disk. Then size and number of direct write buffers to be used will be determined by the values set in other database parameters. If the parameter is set to a third value, direct write buffers will be allocated a portion of the memory available to perform the sort operation. The size and number of direct write buffers will be determined in accordance with database formulae that are designed to optimize sort and data write performance.

19 Claims, 4 Drawing Sheets

ས.799,210

1

METHOD FOR ALLOCATING EITHER PRIVATE OR SHARED BUFFER MEMORY FOR STORING DATA FROM SORT OPERATIONS IN ACCORDANCE WITH AN ASSIGNED VALUE OR THRESHOLD VALUE

FIELD OF THE INVENTION

The present invention relates to buffer memory allocation, and more specifically, to a method and apparatus for allocating direct write buffers for computer processes that perform sort operations.

BACKGROUND OF THE INVENTION

In typical database systems, users store, update and retrieve information by submitting commands to a database application. To be correctly processed, the commands must comply with the database language that is supported by the database application. One popular database language is known as Structured Query Language (SQL).

A logical unit of work that is comprised of one or more database language statements is referred to as a transaction. When multiple users share a database system, it is impractical to allow only one transaction to execute at a time. However, when many transactions are allowed to execute at the same time, it is possible for the transactions to interact in undesirable ways.

Some database systems provide a buffer cache that is shared among the processes that are executing transactions in a database. The buffer cache is a pool of dynamic memory that is used for temporarily storing blocks of data. All processes are allowed to read and store data to the buffer cache. However, to prevent undesirable interaction between processes, only one process or special group of processes, referred to herein as the "writer process", writes updated data from the buffer cache to the database.

Some transactions require sort operations to be performed on data from the database. Space in dynamic memory is required to perform such sort operations. The portion of memory allocated to a transaction to perform a sort operation is referred to as a sort area.

After a process performs a sort operation, the sorted data may have to be written to the database. Typically, the database is updated by writing the sorted data to the buffer cache, and allowing the writer process to store the sorted data from the buffer cache to the database. However, a single process for writing data to a disk represents a potential bottleneck for data throughput, especially where multiple, concurrent users of the database are performing operations that require data to be written to the database.

Consequently, some database systems allow transactions to write sorted data directly to a disk. During direct write sorts, sorted data is written to a set of write buffers that are not shared with other processes. The sorted data is written asynchronously from the write buffers directly to disk, thereby bypassing the buffer cache.

Database systems that allow processes to write sorted data directly to disk often allow a user to specify the number and size of the write buffers. The database system may provide program parameters which the user could set to specify the characteristics of the write buffers. For example, one parameter could be used to set the number of write buffers, and a second parameter could be used to set the size of each write buffer.

Under operating conditions where available memory space is abundant on the system, the direct write sort method

2 is a quick and efficient way to perform database sort operations. Under these conditions, the buffer size and number parameters could be set to values which exceed the expected memory requirements for possible sort operations. However, under operating conditions where memory resources are limited and memory space is not readily available, allocating memory for large write buffers during sorts could result in a reduction of the overall performance of the database.

Based on the foregoing, it is clearly desirable to provide a database system that provides for automatic tuning so that the number and size of write buffers is allocated in accordance with the amount of memory available for sort operations and without the need for user programming of fixed tuning parameters.

SUMMARY OF THE INVENTION

A method and apparatus for allocating buffer memory for database sort operations is provided. According to one aspect of the invention, a programmable database parameter is provided to specify the manner in which buffer memory is allocated for the sort operation.

If the parameter is set to a first value, the sort operation will not allocate any memory for direct buffering, and will instead write data to a buffer cache shared with other transactions.

If the parameter is set to a second value, the process performing the sort operation will write the data to the storage medium through direct write buffers, thus bypassing the buffer cache. The size and number of buffers to be used are specified by additional database parameters.

If the parameter is set to a third value, the sort operation will utilize direct write buffers if the amount of memory allocated to the sort operation exceeds a predetermined minimum threshold. If the sort area does exceed this minimum threshold, direct write buffers will be allocated as a fraction of the amount of memory allocated for the sort operation up to a predetermined maximum threshold. If the sort area does not exceed the minimum threshold, the sorted data will be written to a buffer cache shared with other processes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for allocating buffer memory for sort operations is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
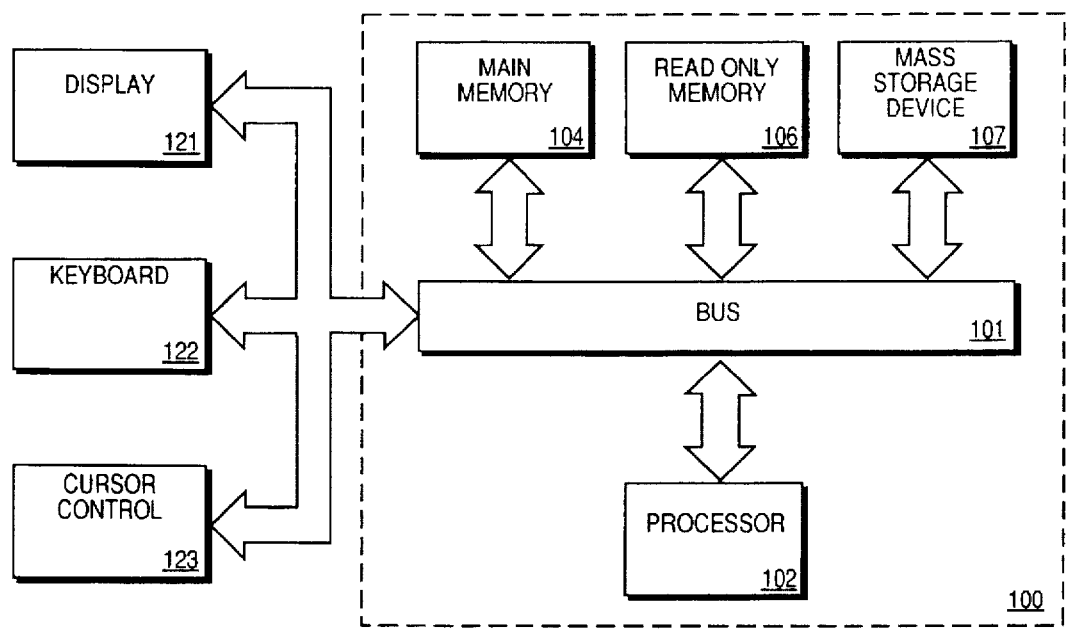
FIG. 1 is a block diagram illustrating a computer system that may be used to implement the present invention.

Referring to FIG. 1, a computer system 100 upon which the preferred embodiment of the present invention can be implemented is shown. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A mass storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. Alternatively, other input devices such as a stylus or pen can be used to interact with the display. A displayed object on a computer screen can be selected by using a stylus or pen to touch the displayed object. Similarly, a light pen and a light sensitive screen can be used for selecting a displayed object.

In one embodiment of the invention, computer system 100 is configured to execute a database application that performs sort operations on data that is to be written to the database. The memory utilized for the performance of the sort operation may be a portion of main memory 104. The amount of memory allocated to perform the sort operation is specified by a programmable database parameter. Such a parameter may be called SORT_AREA_SIZE, and take a value in Kbytes or Mbytes, depending on the availability of memory and the size of the sort operations to be performed.

According to one embodiment of the invention, a database having multiple buffering modes for sort operations is provided. According to one embodiment, the buffering mode used by the database is controlled by a parameter whose value may be set by a user. Such a parameter shall be referred to herein as SORT_DIRECT_WRITE. According to one embodiment, the parameter can assume three possible values: FALSE, TRUE, or AUTO.

When SORT_DIRECT_WRITE is set to FALSE, no direct write buffers are used and sort operations will write to disk through a buffer cache.

When SORT_DIRECT_WRITE is set to TRUE, write buffers are used to write data directly to disk. As shall be described hereafter, the number and size of these buffers may be determined by the values of the parameters SORT_WRITE_BUFFERS and SORT_WRITE_BUFFER_SIZE, respectively. Thus, when SORT_DIRECT_WRITE is set to TRUE, a user selectable tuning method is utilized.

When SORT_DIRECT_WRITE is set to AUTO, an automatic tuning method is utilized. In one embodiment, a set percentage of the sort area is allocated to buffer space as long as there is a minimum amount of sort area memory, and until a maximum amount of buffer memory is reached. Other embodiments of automatic tuning may not require a minimum amount of sort area memory from which to allocate buffer space, or a maximum threshold on the amount of buffer memory allocated.

In one embodiment, the SORT_DIRECT_WRITE parameter can be a database-wide parameter that is set to a particular default value when the database is started, or set by a database administrator. As a database-wide parameter, this parameter determines the method of database tuning for all users of the database at a particular time. Alternatively, the SORT_DIRECT_WRITE parameter can be a user specific parameter which can be set and reset by an individual user, or group of users, to determine the method of database tuning only as to those users. For example, the SORT_DIRECT_WRITE parameter might be passed as a switch in a database query operation.

Buffer Cache Sort

As mentioned above, sorted data is written to a database through a buffer cache when SORT_DIRECT_WRITE is set to FALSE. A buffer cache is a pool of buffers used to cache data that is provided by a database. The buffer cache is shared among processes that access data in the database. In some database systems, a process performing a sort operation on data from a database will use a buffer cache to store sorted data that is to be written to a storage medium, such as a disk. This buffer cache represents a process pipeline which temporarily stores data to be written, and queues write operations among multiple processes or users. In this way, a buffer cache operates as a concurrency monitor to ensure that only one process writes to disk at a time. A buffer cache can be embodied in a dedicated memory unit which is independent of any of the memory allocated for the sort operation. While this method reduces the amount of memory required to perform sort operations, it presents a single process bottleneck through which data is written to disk.

Sort Direct Writes

As further mentioned above, when SORT_DIRECT_WRITE is set to either TRUE or AUTO, write buffers may be used to write data directly to disk. The Sort Direct Write method is asynchronous and direct since the database program does not have to wait for the write to complete before the function that writes the buffer returns, and the program queues its own writes and does not rely upon a server process. A sort operation will write an entire buffer for each input/output operation, and the database process performing the sort will write the sort data directly to the storage medium. The direct write buffer memory is released when the last row is fetched from the sort space.

Figure 2:
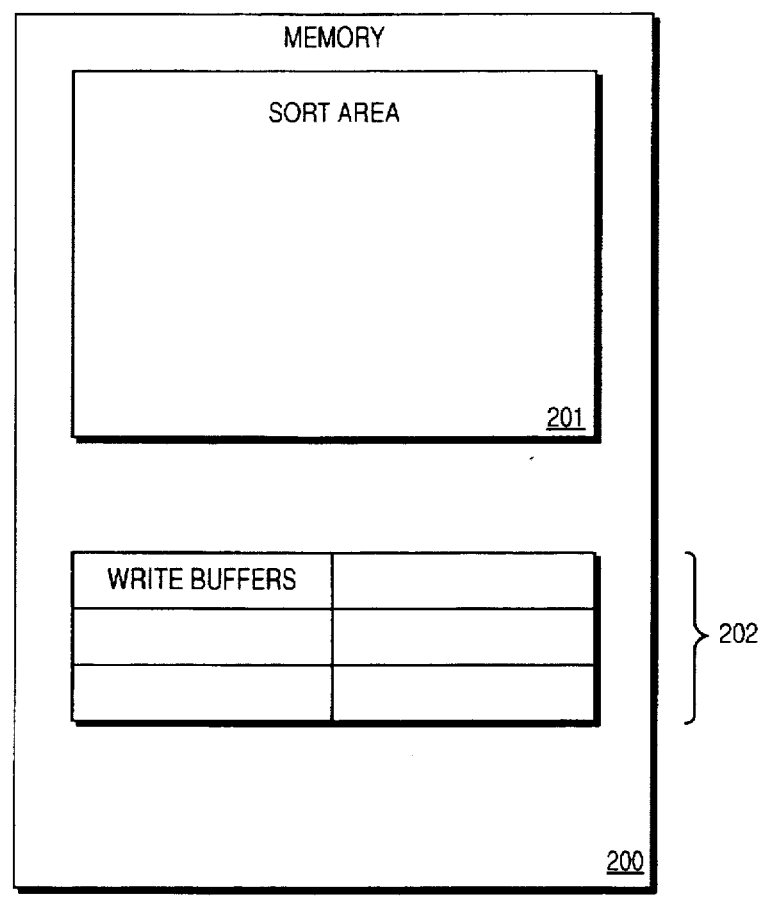
FIG. 2 illustrates a separate sort area and write buffer area within the memory of a computer system.

The memory space allocated to write buffers may be divided into multiple independent buffers, or may comprise one single autonomous buffer. FIG. 2 illustrates a set of write buffers 202 as a portion of memory 200. The number of buffers that the buffer space is divided into, and the size of each buffer, is dependent upon several factors including the amount of memory, the number of concurrent users, and the type of sort process being executed.

Figure 3:
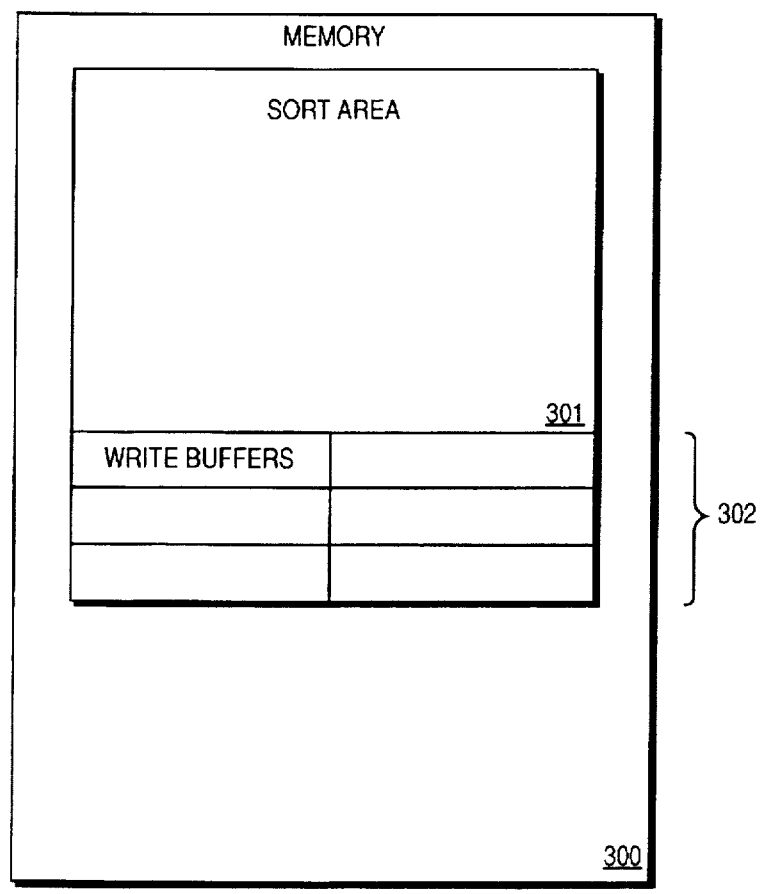
FIG. 3 illustrates the allocation of write buffer area as a portion of sort area when user selectable tuning is utilized.

The number and size of direct write buffers must be specified by the database. If there is sufficient memory in the computer system, then memory for write buffers can be allocated independently of memory allocated for the sort area. This configuration is illustrated in FIG. 2, where the Sort Area 201 is separate from the Write Buffer area 202. If the amount of memory is constrained however, then write buffers may need to occupy some portion of the memory allocated to the sort area. FIG. 3 illustrates the configuration where the Write Buffer area 302 is a sub-portion of Sort Area 301 within memory 300.

Database Tuning

When write buffers are used to write sorted data directly to disk, it is often desirable to increase the amount of memory allocated to these buffers so that more data can be written to disk during each write operation. Thus, in general, as buffer memory is increased, data write performance is increased. However, if memory for the write buffers is allocated from portion of the sort area, then memory for the sort area decreases, as memory for the write buffers increases. As the size of the sort area is reduced, the performance of the sort operations may decrease since large sort operations will require increased sorts to disk if they cannot complete a sort within the allocated memory. Therefore, performance tradeoffs must be made between data writes and sort operations, as memory is allocated between write buffers and sort area.

Maintaining the optimum balance between the memory allocated to the write buffers and the sort area depends on several factors such as the amount of memory in the computer system, the number of database users, and the number and size of expected sort operations. The process of allocating memory for the direct write buffers from a portion of the sort area to maintain an optimum balance is one aspect of "tuning" the database.

User Selectable Buffer Memory Allocation

In one embodiment wherein the SORT_DIRECT_WRITE parameter is set to TRUE, memory for the sort area and direct write buffers is allocated by programming one or more additional database parameters.

In one such embodiment, two database parameters are provided to specify the size and number of write buffers to be used for Sort Direct Writes. A database parameter, SORT_WRITE_BUFFERS, takes an integer value and can be used to specify the number of write buffers. Likewise, a parameter, SORT_WRITE_BUFFER_SIZE, takes a byte value and can be used to specify the size of each direct write buffer.

The amount of write buffer memory available for each database process that performs sort operations will be determined by the formula:

SORT_WRITE_BUFFERS*SORT_WRITE_BUFFER_SIZE

If memory is abundant, the direct write buffers can be allocated memory which is not a portion of the sort area. In this case, buffer memory will add to the memory specified by the parameter SORT_AREA_SIZE. The allocation of memory between sort area and write buffers, where write buffer memory is independent of the sort area is illustrated in FIG. 2.

Alternatively, if memory is constrained, the sort area can be decreased by the amount of memory allocated to the direct write buffers. In this case, the portion of the sort area memory allocated for direct write buffers should be determined using tuning techniques that provide the optimum compromise between sort operation performance and direct write performance. For many applications, the total memory allocated for write buffers should comprise less than ten percent of the memory allocated for the sort area. If the memory allocated to the write buffers is greater than ten percent of the sort area, then the number of sorts to disk will likely increase, and overall performance will correspondingly decrease. The allocation of memory between the sort area and write buffers, where write buffer memory is a portion of the sort area is illustrated in FIG. 3.

One example of a range of values for the write buffer parameters is as follows:

SORT_WRITE_BUFFER_SIZE: 32 Kbytes to 64 Kbytes.

SORT_WRITE_BUFFERS: 2 to 8

These values provide for a minimum of 64 Kbytes, and a maximum of 512 Kbytes of write buffers. The size of the each write buffer should be calculated as a multiple of the database block size, rather than an arbitrary value.

The values given above for the two write buffer parameters are intended only to be examples of possible values for the user selectable mode of database tuning. Actual values will depend on a number of factors such as the type of sort algorithm used by the database program, the number of database users, and the amount of memory available in the computer system, among others.

In one embodiment, the parameters SORT_WRITE_BUFFER_SIZE and SORT_WRITE_BUFFERS may be set by the database administrator. In this case, the direct write buffer space is set at one time for all users of the database regardless of the number and size of their respective sort operations. This provides the advantage of central control over the memory resources of the computer system, and reduces the amount of programming and decision-making required by individual users.

In another embodiment, the parameters SORT_WRITE_BUFFER_SIZE and SORT_WRITE_BUFFERS may be set individually by each database user, or group of database users. This scheme provides the advantage of allowing users to tailor their memory requirements to fit their individual needs, and allows for a more efficient use of memory across the entire database.

In yet another embodiment, the parameters SORT_WRITE_BUFFER_SIZE and SORT_WRITE_BUFFERS may be passed as switches in database transactions that perform sort operations. This scheme allows the allocation of buffer memory on individual database operations independently of the users of the database who perform the sort operation.

Automatic Buffer Memory Allocation

In one embodiment wherein the SORT_DIRECT_WRITE parameter is set to AUTO, memory for the sort area and direct write buffers is automatically allocated by the database program to be a portion of the sort area. This auto tuning mechanism eliminates the need for the database administrator or individual users to manually set buffer size and number parameters such as the SORT_WRITE_BUFFERS and SORT_WRITE_BUFFER_SIZE parameters mentioned above.

Figure 4:
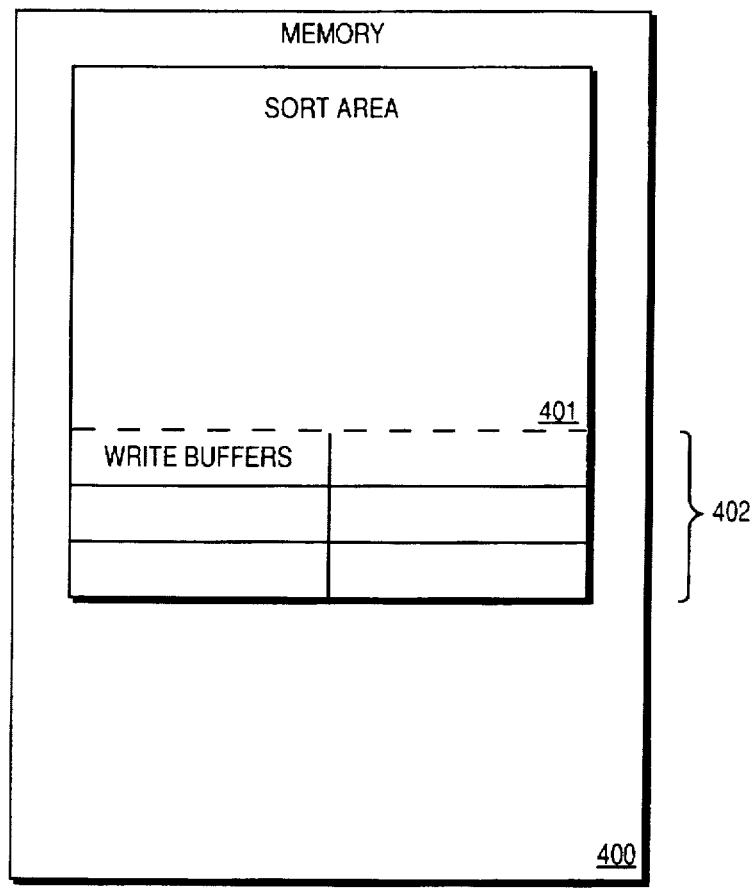
FIG. 4 illustrates the allocation of write buffer area as a portion of sort area when automatic tuning is utilized.

FIG. 4 illustrates the composition of memory 400 as allocated to Sort Area 401 and Write Buffers 402. The dashed line between the Sort Area and the Write Buffer space denotes that the database will automatically allocate memory to the write buffers as a portion of the sort area.

In one embodiment of automatic buffer memory allocation, an arithmetic formula may be provided in the database for use by database transactions which perform sort operations to determine how much sort area to allocate to write buffers. The factors to be included in the formula may include the percentage of the sort area to be allocated to write buffers, the minimum amount of sort area memory required for direct write buffers, the maximum amount of memory to be allocated to write buffers, and the number and size of the write buffers.

1. Percentage of Sort Area Allocated to Write Buffers

One variable related to automatic tuning is the percentage of the sort area that is allocated to write buffer space. Conceivably, anywhere between zero to one hundred percent of the sort area can be allocated to write buffer space. The optimum percentage of the sort area allocated to buffer space will depend upon several factors, such as the particular requirements of individual sort operations, the number of database users, and the availability of computer system resources.

In one embodiment, the percentage of sort area to be allocated to buffer memory may be expressed in a mathematical formula. For example, the sort area size could be multiplied by a fractional value to derive the buffer memory space.

For example, if optimum performance is achieved when ten percent of the sort area is allocated to write buffer space, then the formula to be provided in the database could be of the form:

BUFFER_MEMORY=0.1*SORT_AREA_SIZE

In this example, the total size of the sort area is specified by the database parameter SORT_AREA_SIZE, and 90% of this area will be memory for sorting and the other 10% of this area will be buffer space.

2. Minimum Sort Area Size for Automatic Direct Write Buffering

Many database applications in which sort operations are performed, require at least a minimum amount of memory for sorting. When the sort area is at such a minimum, allocating a portion of the sort area for buffer space may cause a marked decrease in performance because direct writes to buffer space will force sorts to disk. For example, direct write buffering may only present a performance advantage if there are at least 640 Kbytes of memory for the sort area. In this case, the automatic tuning mechanism should only start to allocate memory to buffer space when the sort area exceeds 640 Kbytes.

In one embodiment, the minimum amount of memory required to be available for the sort area before any memory is to be allocated to write buffers can be provided by a database parameter or switch called by the process utilizing the automatic database tuning mode.

Alternatively, the minimum memory requirement may be determined by basing it on the minimum write buffer configuration provided by the manual tuning parameters, SORT_WRITE_BUFFER_SIZE and SORT_WRITE_BUFFERS. For example, if the minimum values for SORT_WRITE_BUFFERS equals 2 and SORT_WRITE_BUFFER_SIZE equals 32 Kbytes, then the minimum buffer configuration is 2*32 Kbytes which is 64 Kbytes. In this case, if the portion of the sort area to be allocated to write buffers is ten percent, then write buffers will be allocated if the sort area is 640 Kbytes or greater.

While certain embodiments of automatic tuning may require a minimum threshold amount of sort area memory to be available before memory is allocated to the write buffers. Other embodiments, however, may not require a minimum threshold of memory to be exceeded. In this case as long as any memory is available for the sort area, a certain portion of that area will be allocated to write buffers.

3. Maximum Write Buffer Space

In certain applications, the allocation of write buffer space above a certain amount of memory may provide no further increase in data write performance. When this is the case, the automatic tuning mechanism should allocate memory from the sort area to the buffer space only up to this maximum threshold. Once this threshold is reached, any increase to the sort memory should be allocated entirely to the sort area, and none to the buffer space.

In one embodiment, the maximum memory threshold for buffer space can be provided by a database parameter or switch called by the process utilizing the automatic database tuning mode. For example, the maximum amount of memory for direct write buffers could be set at 512 Kbytes. In this case, if the portion of the sort area to be allocated to write buffers is ten percent, then ten percent of the sort area will be allocated to write buffers until the write buffer space reaches 512 Kbytes. Thereafter, any increase to the sort area, once the sort area reaches a size of 5.2 Mbytes will all be apportioned to the sort area, and none will be apportioned to the buffer space.

4. Size and Number of Write Buffers

For automatic tuning, once the amount of buffer space is determined, the number and size of the buffers comprising the buffer space must be determined. In one embodiment these variables can be determined by the use of internal database formulas which are optimized for various application and resource situations. For example, if the amount of buffer memory is below a certain value, and there are a minimum number of users, one 32 Kbyte buffer may be sufficient. In other situations, performance might be increased if this 32 Kbyte buffer is provided in the form of two 16 Kbyte buffers, or four 8 Kbyte buffers. Obviously, many different combinations are available and the specific formulae to be used will depend on actual implementation constraints and optimization criteria.

In this embodiment, the portion of the sort area to be allocated to write buffers would be determined by one database formula, and the configuration of the buffers comprising the buffer space would be determined by a second database formula.

In an alternative embodiment, the number and size of the write buffers created by automatic tuning may be provided by one or more additional database parameters such as the manual tuning parameters, SORT_WRITE_BUFFERS and SORT_WRITE_BUFFER_SIZE.

In this alternative embodiment, the portion of the sort area to be allocated to write buffers would be determined by a database formula, and the configuration of the buffers comprising the buffer space would be provided by programmed parameters.

Combining all of the variables addressed in this section provides one embodiment of automatic tuning as an example of the allocation of buffer memory for Sort Direct Writes. In this embodiment, a database formula would be utilized by a process performing sort operations to perform automatic tuning. This formula would allocate ten percent of the sort area memory above 640 Kbytes to write buffer space until a maximum of 512 Kbytes of buffer space is reached. For sort areas of less than 640 Kbytes, no memory is allocated to write buffers, and sorted data will be written to disk through the buffer cache.

The foregoing was intended only to be one example of possible values to be used in the determination of a minimum write buffer configuration. Actual values will depend on a number of factors such as the type of sort algorithm used by the database program, the number of database users, and the amount of memory available in the computer system, among others.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of allocating buffer memory for storing data generated by a process that is performing a sort operation on data to be written to a database in a computer system, the method comprising the steps of:

allocating a first amount of memory that is private to said process for performance of said sort operation;

inspecting a value assigned to a first parameter;

if said first parameter is set to a first value, then allocating no portion of memory that is private to said process as buffer memory for storing data from said sort operation; and causing said process to buffer data from said sort operation in a buffer cache shared by other processes;

if said first parameter does not have said first value, then determining a second amount of memory to be used for write buffers for storing data from said sort operation; and allocating said second amount of memory that is private to said process as buffer memory for storing data from said sort operation.

2. The method of claim 1 further comprising the step of:

if said first parameter has a second value, then determining said second amount of memory by a predetermined formula based on said first amount of memory.

3. The method of claim 2 further comprising the step of:

if said first parameter has a third value, then determining said second amount of memory based on one or more parameters set by a user.

4. The method of claim 3 wherein:

said one or more parameters includes a first parameter and a second parameter;

the step of allocating said second amount of memory to said process as buffer memory is performed by allocating a number of write buffers based on a value of said first parameter; and each of said write buffers has a size based on a value of said second parameter.

5. The method of claim 2 further comprising the steps of:

determining if said first amount of memory exceeds a first threshold value;

if said first amount of memory exceeds said first threshold value, then determining said second amount of memory by said predetermined formula based on said first amount of memory;

if said first amount of memory does not exceed said first threshold value, then allocating no portion of memory to said process as buffer memory for storing data from said sort operation.

6. The method of claim 5 wherein:

the step of allocating said second amount of memory to said process as buffer memory is performed by allocating a number of write buffers based on said predetermined formula.

7. The method of claim 6 wherein the step of allocating a number of write buffers based on said predetermined formula includes the steps of:

determining a second threshold value;

allocating said second portion of memory such that said second portion of memory does not exceed said second threshold value.

8. The method of claim 5 wherein:

the step of allocating said second amount of memory to said process as buffer memory further includes the steps of:

inspecting a value assigned to a third parameter;

inspecting a value assigned to a fourth parameter;

the step of allocating said second amount of memory to said process as buffer memory is performed by allocating a number of write buffers based on said third parameter; and each of said write buffers has a size determined by said fourth parameter.

9. The method of claim 1 wherein the step of allocating said second amount of memory includes the step of allocating said second amount of memory from a portion of the first amount of memory.

10. A method of buffering data from a sort operation performed by a process in a computer system, the method comprising the steps of:

determining a first amount of memory available for said sort operation;

determining if said first amount of memory exceeds a first threshold value;

if said first amount of memory does not exceed said first threshold value, then performing said sort operation using said first amount of memory, and writing said data to a buffer cache that is shared among other processes; and if said first amount of memory does exceed said first threshold value, then performing said sort operation using a first portion of said first amount of memory, and writing said data to a set of buffers that are not shared among other processes.

11. The method of claim 10 wherein said step of writing to a set of buffers that are not shared includes the step of writing to buffers stored in a second portion of said first amount of memory.

12. The method of claim 10 further comprising the step of determining a second amount of memory to allocate to said set of buffers based on said first amount of memory.

13. The method of claim 12 wherein said step of determining a second amount of memory to allocate to said set of buffers includes the steps of allocating as said second amount of memory a fraction of said first amount of memory.

14. The method of claim 10 wherein said data is data retrieved from a database, and wherein said step of writing said data to a buffer cache that is shared among said other processes includes the step of writing said data to said buffer cache while other processes are accessing data from said database.

15. A computer-readable medium having stored thereon a plurality of sequences of instructions, said plurality of sequences of instructions including sequences of instructions which, when executed by a processor, cause said processor to perform the steps of:

allocating a first amount of memory that is private to said process for performance of said sort operation;

inspecting a value assigned to a first parameter;

if said first parameter is set to a first value, then
  allocating no portion of memory that is private to said process as buffer memory for storing data from said sort operation; and
  causing said process to buffer data from said sort operation in a buffer cache shared by other processes;

if said first parameter does not have said first value, then
  determining a second amount of memory to be used for write buffers for storing data from said sort operation; and
  allocating said second amount of memory that is private to said process as buffer memory for storing data from said sort operation.

16. The computer-readable medium of claim 15 further comprising instructions which, when executed by the processor, would cause the processor to perform the step of determining said second amount of memory by a predetermined formula based on said first amount of memory when said first parameter has a second value.

17. The computer-readable medium of claim 16 further comprising instructions which, when executed by the processor, would cause the processor to perform the step of determining said second amount of memory by one or more parameters set by a user when said memory has a third value.

18. The computer-readable medium of claim 15 wherein the step of allocating said second amount of memory includes the step of allocating said second amount of memory from a portion of the first amount of memory.

19. A method of allocating buffer memory for storing data generated by a process that is performing a sort operation on data to be written to a database in a computer system, the method comprising the steps of:

allocating a first amount of memory to said process for performance of said sort operation;

inspecting a value assigned to a first parameter;

if said first parameter is set to a first value, then
  allocating no portion of memory to said process as buffer memory for storing data from said sort operation; and
  causing said process to buffer data from said sort operation in a buffer cache shared by other processes;

if said first parameter does not have said first value, then
  determining a second amount of memory to be used for write buffers for storing data from said sort operation, where the second amount of memory is a subset portion of the first amount of memory; and
  allocating said second amount of memory to said process as write buffer memory for storing data from said sort operation, wherein data stored in the write buffer memory can be written directly to the database.

* * * * *